US010612936B2

(12) United States Patent
Tang

(10) Patent No.: US 10,612,936 B2
(45) Date of Patent: Apr. 7, 2020

(54) NAVIGATION SYSTEM WITH DELIVERY MECHANISM AND METHOD OF OPERATION THEREOF

(71) Applicant: Telenav, Inc., Santa Clara, CA (US)

(72) Inventor: Ky Tang, Milpitas, CA (US)

(73) Assignee: Telenav, Inc., Santa Clara, CA (US)

( * ) Notice: Subject to any disclaimer, the term of this patent is extended or adjusted under 35 U.S.C. 154(b) by 98 days.

(21) Appl. No.: 15/694,625

(22) Filed: Sep. 1, 2017

(65) Prior Publication Data

US 2019/0072410 A1    Mar. 7, 2019

(51) Int. Cl.
*G01C 21/36* (2006.01)
(52) U.S. Cl.
CPC ..... *G01C 21/3697* (2013.01); *G01C 21/3629* (2013.01); *G01C 21/3679* (2013.01)

(58) Field of Classification Search
CPC .............. G01C 21/3629; G01C 21/3679
USPC .............................................. 701/516
See application file for complete search history.

(56) References Cited

U.S. PATENT DOCUMENTS 8,589,069 B1 * 11/2013 Lehman ............... G01C 21/20
340/995.1

\* cited by examiner

*Primary Examiner* — Maceeh Anwari
(74) *Attorney, Agent, or Firm* — Perspectives Law Group, Corp.

(57) ABSTRACT

A method of operation of a navigation system includes determining a travel context with a control unit based on a traveling speed; determining a presentation permission based on the travel context for actuating a presentation interface; and determining a presentation location based on the presentation permission for identifying the presentation interface to present a presentation content.

20 Claims, 6 Drawing Sheets

NAVIGATION SYSTEM WITH DELIVERY MECHANISM AND METHOD OF OPERATION THEREOF

TECHNICAL FIELD

The present invention relates generally to a navigation system, and more particularly to a system with delivery mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system improving delivery mechanism to control an operation of vehicle has become a paramount concern for the consumer. The inability decreases the benefit of using the tool.

Thus, a need still remains for a navigation system with delivery mechanism to a device during operation of vehicle. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a travel context with a control unit based on a traveling speed; determining a presentation permission based on the travel context for actuating a presentation interface; and determining a presentation location based on the presentation permission for identifying the presentation interface to present a presentation content.

The present invention provides a navigation system, including: a control unit for: determining a travel context based on a traveling speed; determining a presentation permission based on the travel context for actuating a presentation interface; determining a presentation location based on the presentation permission for identifying the presentation interface to present a presentation content; and a communication unit, coupled to the control unit, for transmitting the presentation content for displaying on a device.

The present invention provides a navigation system having a non-transitory computer readable medium including instructions for execution, the instructions comprising: determining a travel context with a control unit based on a traveling speed; determining a presentation permission based on the travel context for actuating a presentation interface; and determining a presentation location based on the presentation permission for identifying the presentation interface to present a presentation content.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
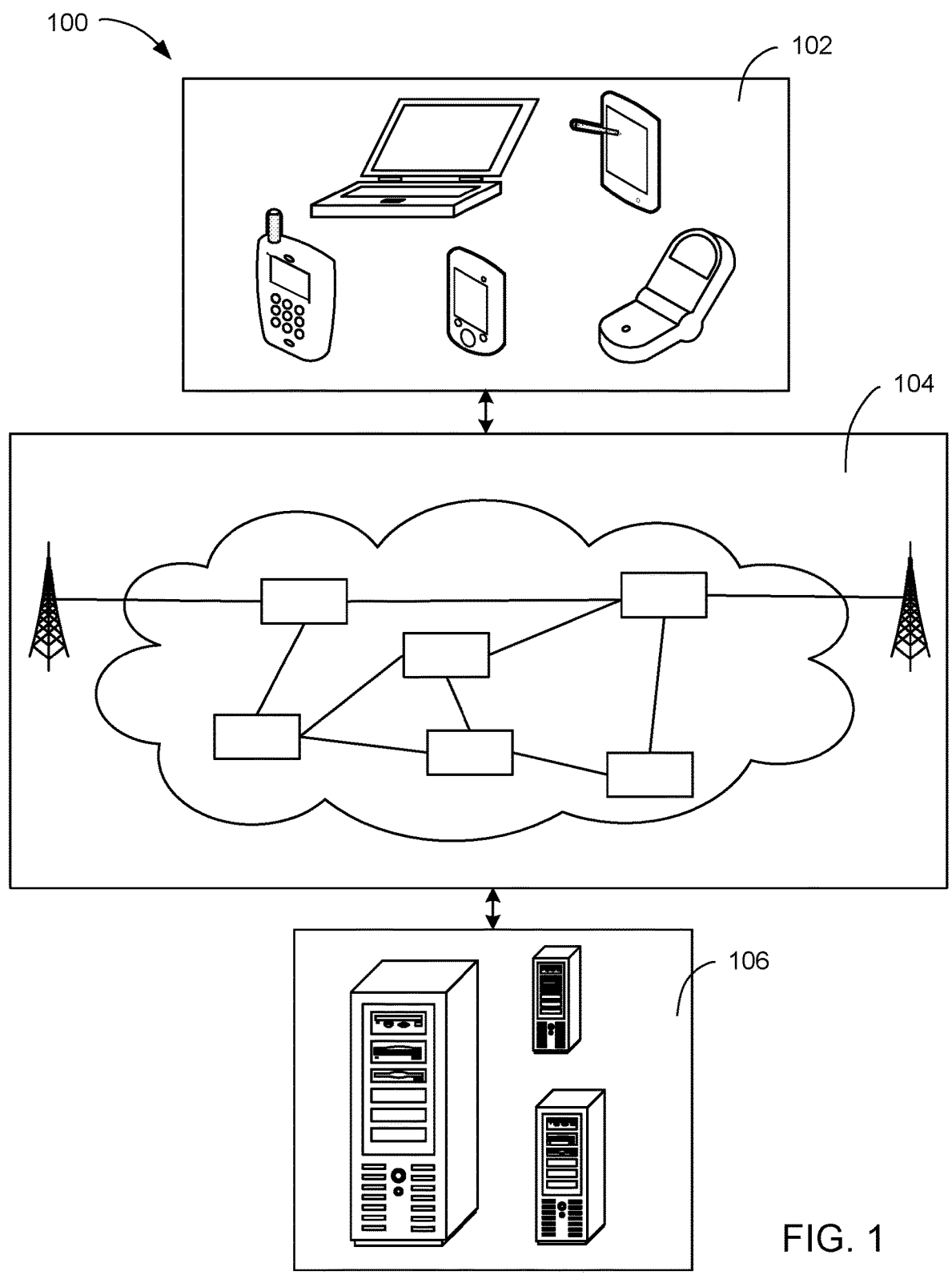
FIG. 1 is a navigation system with delivery mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

Referring now to FIG. 1, therein is shown a navigation system 100 with delivery mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, a head unit, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
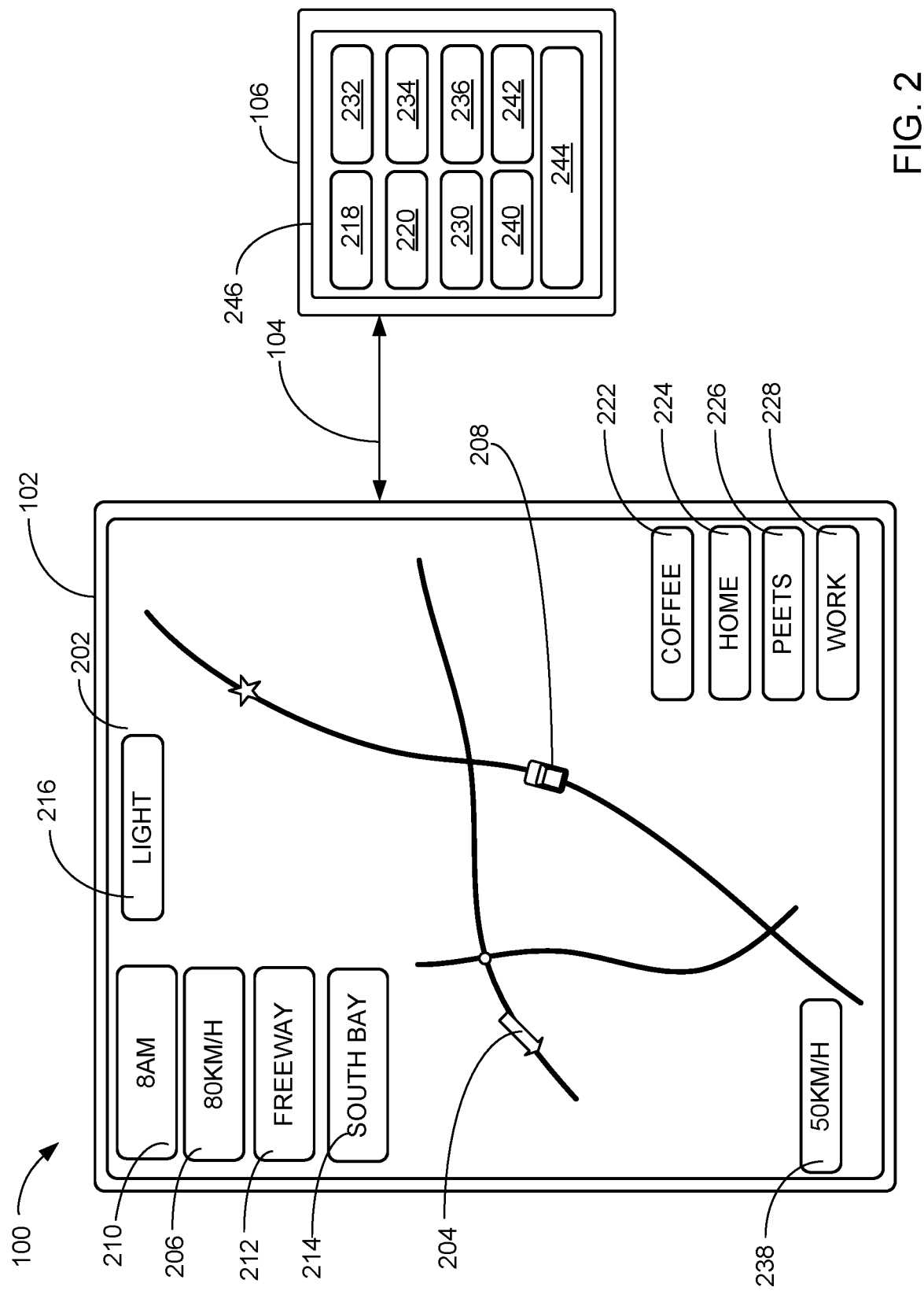
FIG. 2 is an example of a context factor.

Referring now to FIG. 2, there is shown an example of a context factor 246. For clarity and brevity, the discussion of the embodiment of the present invention will focus on the first device 102 delivering the result generated by the navigation system 100. However, the second device 106 and the first device 102 can be discussed interchangeably. The first device 102 and the second device 106 can communicate via the communication path 104.

The context factor 246 can represent information factored by the navigation system 100 to determine a travel context 202. The travel context 202 is defined as a situation or condition surrounding a user's travel. For example, the context factor 246 can include a vehicle heading 204, a traveling speed 206, a current location 208, a time period 210, a road type 212, a geographic area 214, a traffic information 216, an inside context 218, an outside context 220, or a combination thereof. The context factor 246 can also include a category of interest 222, a start location 224, a waypoint 226, a target location 228, a travel distance 230, a noise level 232, a user profile 234, a passenger profile 236, or a combination thereof. The navigation system 100 can determine the travel context 202 based on the each instance of the context factor 246 discussed above or in various combinations of the each instance of the context factor 246.

The vehicle heading 204 is defined as a direction of where a vehicle is moving towards. For example, the vehicle heading 204 can include moving forward or reverse. For another example, the vehicle heading 204 can include moving in a direction of Cardinal Coordinates. The traveling speed 206 is defined as a rate of motion. For example, the user with the first device 102 traveling on a user's vehicle can travel at the traveling speed 206 of 100 kilometers per hour. A speed limit 238 is defined as a threshold. For example, the speed limit 238 can include a maximum or minimum speed allowed on the road type 212. For further example, the speed limit 238 can include the government defined speed permitted for traveling on the road type 212.

The road type 212 is a classification of the road. For example, the road type 212 can include a local road, an arterial road, an expressway, a freeway, a highway, or a combination thereof. The current location 208 is defined as a present physical location of the first device 102. For example, the navigation system 100 can detect the current location 208 of the user with the first device 102 with the GPS within the geographic area 214. The geographic area 214 can include the physical area traveled by the user. For another example, the geographic area 214 can include a geographic region the user is planning to travel to.

The start location 224 is defined as a starting point of the user's travel. The target location 228 is defined as an end point of the user's travel. The waypoint 226 is defined as an intermediate point of the user's travel. For example, the user's travel can start from the start location 224 going through the waypoint 226 and finally reaching the target location 228. The travel distance 230 is defined as a physical distance between geographic locations. For example, the travel distance 230 between the start location 224 and the target location 228 can represent 40 miles. A distance threshold 240 is defined as a limit for a distance. For example, the distance threshold 240 can represent the maximum or minimum distance for the travel distance 230 that the user can travel.

The traffic information 216 can include status of the road type 212 including a movement of vehicles, an availability of accident, an availability of hazard, or a combination thereof. For further example, the traffic information 216 can include the traveling speed 206 of the traffic flow within the geographic area 214. The time period 210 is defined as a timeframe. For example, the time period 210 can include a time of day, week, month, year, season, or a combination thereof. For further example, the traffic information 216 during the time period 210 of the morning can be different from the time period 210 of the evening. For another example, the time period 210 can represent a span of time including seconds, minutes, hours, days, weeks, months, years, or a combination thereof. A time threshold 242 is defined as a limit on the timeframe. The time threshold 242 can represent a minimum or maximum timeframe.

The inside context 218 is defined as a situation or condition inside of the user's vehicle. The outside context 220 is defined as a situation or condition outside of the user's vehicle. The noise level 232 is defined as a level of loudness. For example, the noise level 232 can be measured by decibels. A noise threshold 244 is defined as a limit of the noise level 232. For example, the noise threshold 244 can represent the maximum or minimum level of the noise level. More specifically as an example, the noise level 232 of the inside context 218 can be different from the noise level 232 of the outside context 220. For a specific example, the noise level 232 can meet or exceed the noise threshold 244 for the inside context 218 while the noise level 232 can be below the noise threshold 244 for the outside context 220.

A category of interest 222 is a classification of the geographic location. For example, the category of interest 222 can include a type of restaurant, shop, vendor, or a combination thereof. The category of interest 222 can include a type of entertainment, cuisine, vehicle, or a combination thereof. The user profile 234 is defined as information regarding the user. For example, the user profile 234 can represent the personal information regarding the user who is the driver of the vehicle. The passenger profile 236 is defined as information regarding the passenger of the vehicle. For example, the passenger profile 236 can represent the personal information regarding a person other the driver of the vehicle. The user can represent the driver or the passenger.

Figure 3:
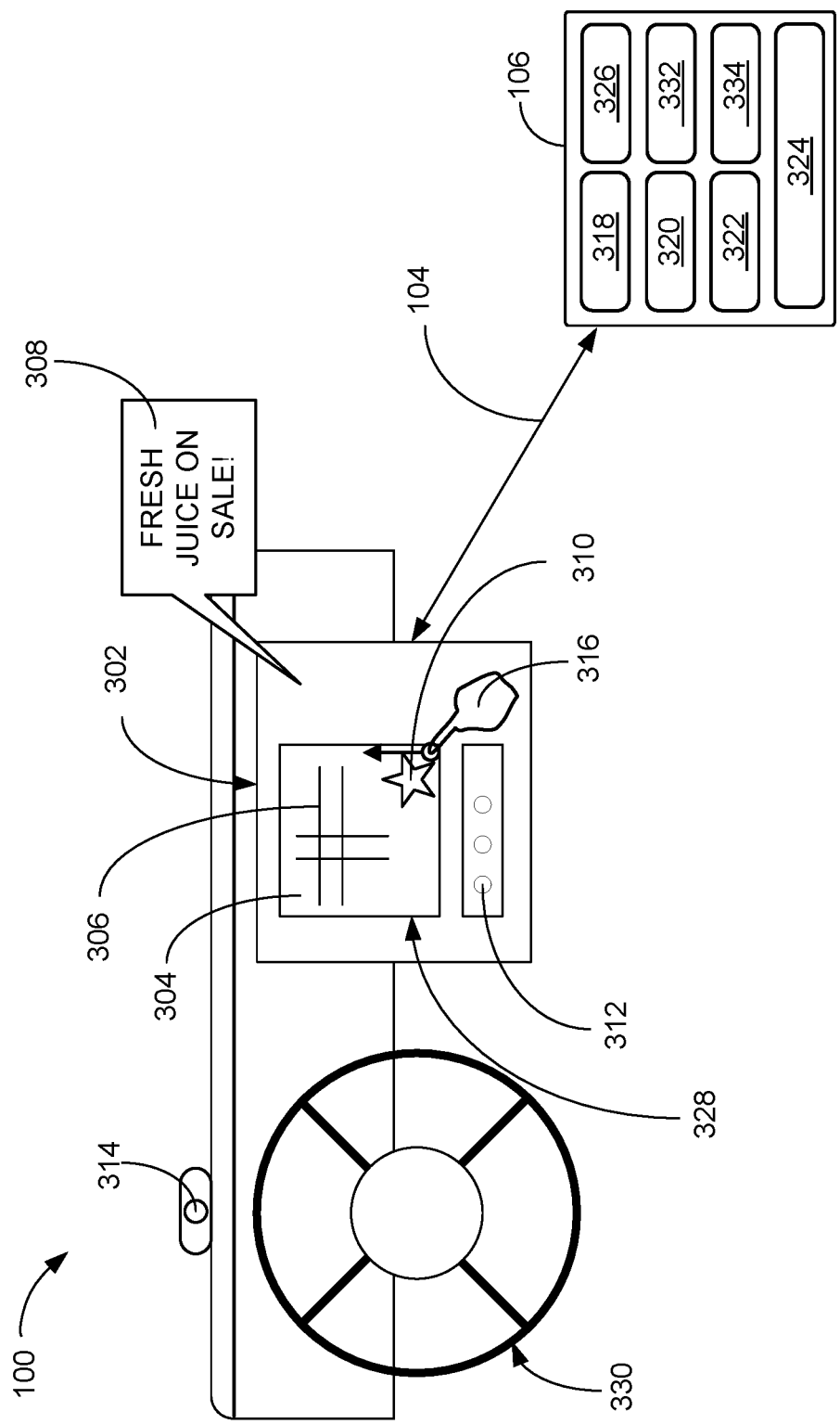
FIG. 3 is an example of a presentation interface.

Referring now to FIG. 3, there is shown an example of a presentation interface 302 presenting a presentation content 304. For clarity and brevity, the discussion of the embodiment of the present invention will focus on the first device 102 delivering the result generated by the navigation system 100. However, the second device 106 and the first device 102 can be discussed interchangeably. The first device 102 and the second device 106 can communicate via the communication path 104.

The presentation interface 302 can represent a hardware device to present the presentation content 304. For example, the presentation interface 302 can include a hardware device to display the human machine interface (HMI), a graphical user interface (GUI), or a combination thereof. For another example, the presentation interface 302 can include a hardware device to play a display content 306, an audio content 308, or a combination thereof.

The presentation content 304 is defined as information presented by the presentation interface 302. For example, the presentation content 304 can include an application 310, an advertisement, or a combination thereof. The application 310 can include a software application displayed as part of the HMI, the GUI, or a combination thereof. The advertisement can include a background advertisement. The presentation content 304 can include augmented reality.

For additional example, the presentation content 304 can include a presentation type 312 such as the display content 306, the audio content 308, or a combination thereof. The presentation type 312 is defined as a classification of the presentation content 304. The display content 306 is defined as a visual information. For example, the display content 306 can include a still image, a dynamic image, a video stream, or a combination thereof. The audio content 308 is defined as an audio information. For example, the audio content 308 can include an audio message, audio advertisement, or a combination thereof.

The user's vehicle, the first device 102, or a combination thereof can include a capturing device 314. The capturing device 314 can capture, track, monitor, detect, or a combination thereof. For example, the capturing device 314 can include a digital camera, video camera, thermal camera, night vision camera, infrared camera, x-ray camera, or the combination thereof. More examples regarding the capturing device 314 are described below. The capturing device 314 can capture a user action 316.

The user action 316 is defined as movement performed by the user. For example, the user action 316 can include an interaction by the user with the application 310, the presentation content 304, or a combination thereof presented by the presentation interface 302. For another example, the user action 316 can include the gesture performed within the user's vehicle detected by the capturing device 314. An action type 318 is defined as a classification of the user action 316. For example, the action type 318 can include physical movement, a voice command, or a combination thereof by a person inside the vehicle.

The navigation system 100 can track the user action 316 with the presentation content 304 as a user engagement 320. The user engagement 320 is defined as an encounter between the person and the navigation system 100. For example, the user engagement 320 can include the user action 316 of selecting the presentation content 304 presented on the HMI. An inactivity time 322 is defined as a timeframe where the user engagement 320 is not detected. For example, the inactivity time 322 can represent the timeframe where the user action 316 is not detected meets or exceeds the time threshold 242 of FIG. 2.

A presentation time 324 is defined as a duration of presenting the presentation content 304. For example, the duration can be represented in seconds, minutes, hours, days, weeks, months, years, or a combination thereof. A presentation permission 326 is defined as an authorization to present the presentation content 304. For example, presentation permission 326 can be represented as "yes" or "no" to allow the navigation system 100 to present the presentation content 304 by the presentation interface 302. A presentation location 328 is defined as a location to present the presentation content 304. For example, there can be multiple instances of the presentation interface 302. More specifically as an example, the presentation location 328 can be represented as which instance of the presentation interface 302 to present the presentation location 328. For further example, if the navigation system 100 chose the presentation interface 302 representing the head unit, the presentation location 328 can represent the head unit.

A vehicle functionality 330 is defined as a performing component of the vehicle. For example, the vehicle functionality 330 can include a steering wheel, a windshield wiper, or a combination thereof. A vehicle status 332 is defined as a state of the vehicle. For example, the vehicle status 332 can include the fuel level, temperature, or a combination thereof of the vehicle. A diagnostics result 334 is defined as a result from the vehicle's self-diagnostic and reporting capability. For example, the on-board diagnostics (OBD) of the vehicle can generate the diagnostics result. For further example, the vehicle status 332 can include the diagnostics result 334.

Figure 4:
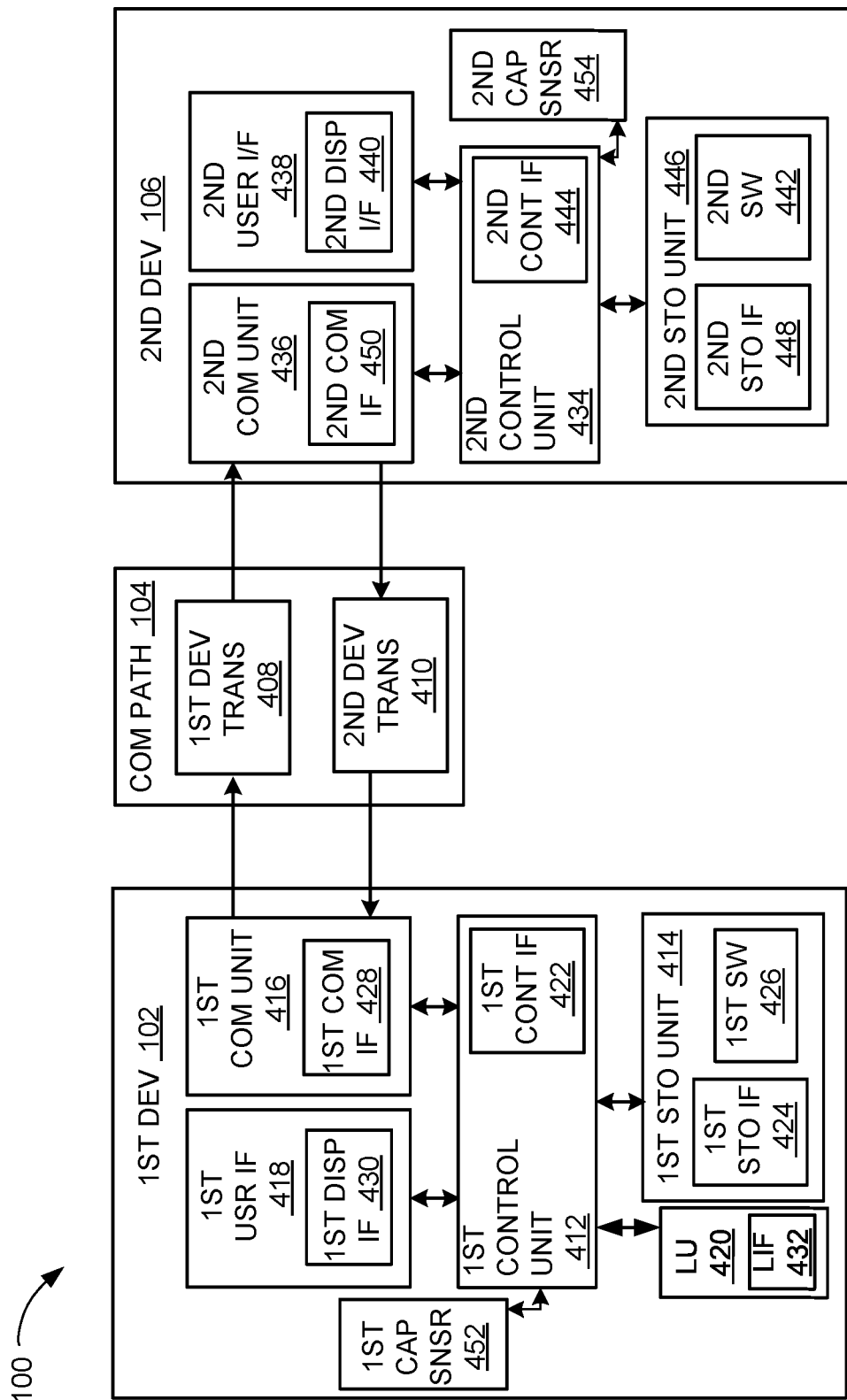
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, a camera, or any combination thereof to provide data and communication inputs.

The first user interface 418 can include a first display interface 430. The first display interface 430 can include a display, a projector, a video screen, a speaker, a headset, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, a camera, or any combination thereof to provide data and communication inputs. Examples of the output device of the second user interface 438 can include a second display interface 440. The second display interface 440 can include a display, a projector, a video screen, a speaker, a headset, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

A first capturing device 452 can represent the capturing device 314 of FIG. 3. Examples of the first capturing device 452 can include a digital camera, video camera, thermal camera, night vision camera, infrared camera, x-ray camera, or the combination thereof. Examples of the first capturing device 452 can further include accelerometer, thermometer, microphone, wireless signal receiver, remote physiological monitoring device, light identifier, magnetic sensor, tactile sensor, or the combination thereof.

A second capturing device 454 can represent the capturing device 210. Examples of the second capturing device 454 can include a digital camera, video camera, thermal camera, night vision camera, infrared camera, x-ray camera, or the combination thereof. Examples of the second capturing device 454 can further include accelerometer, thermometer, microphone, wireless signal receiver, remote physiological monitoring device, light identifier, magnetic sensor, tactile sensor, or the combination thereof.

Figure 5:
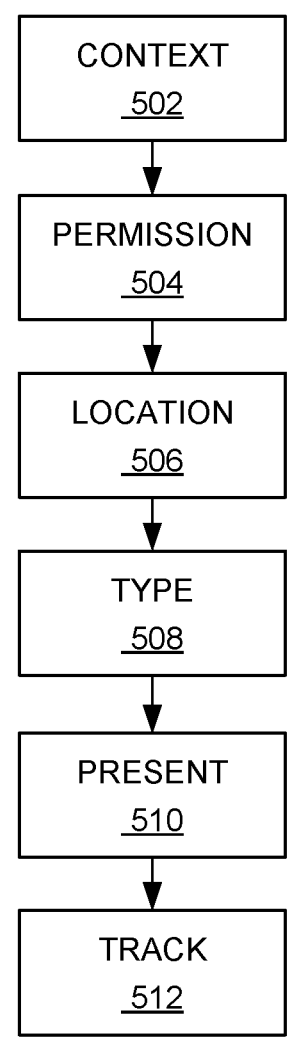
FIG. 5 is a control flow of the navigation system.

Referring now to FIG. 5, therein is shown a control flow of the navigation system 100. The navigation system 100 can include a context module 502. The context module 502 determines the travel context 202 of FIG. 2. For example, the context module 502 can determine the travel context 202 based on the context factor 246 of FIG. 2 including the user action 316 of FIG. 3, the inactivity time 322 of FIG. 3, the vehicle heading 204 of FIG. 2, the traveling speed 206 of FIG. 2, the vehicle status 332 of FIG. 3, or a combination thereof dynamically and in real time.

The context module 502 can determine the travel context 202 in a number of ways. For example, the context module 502 can determine the travel context 202 based on the user action 316. The user can operate the vehicle as a driver. The vehicle can include the first device 102 of FIG. 1 representing the vehicle's human machine interface (HMI). The HMI can display the graphical user interface (GUI) of the application 310 of FIG. 3 for the user to select. The user can perform the user action 316 representing the touch to the presentation interface 302 of FIG. 3 representing a display screen of the HMI to operate the application 310 on the first device 102. The presentation interface 302 can include the first user interface 418 of FIG. 4, the first display interface 430 of FIG. 4, or a combination thereof. Based on the user action 316 representing the contact by the user on the GUI of the application 310, the display screen, or a combination thereof, the context module 502 can determine the travel context 202 representing the user action 316 of the user engaging with the first device 102.

For a different example, the context module 502 can determine the travel context 202 based on the inactivity time 322. The context module 502 can determine the inactivity time 322 meeting or exceeding the time threshold 242 of FIG. 2. As discussed above, the user action 316 can include interacting with the HMI. If the inactivity time 322 from the user not interacting with the HMI meets or exceeds the time threshold 242, the context module 502 can determine that the travel context 202 to represent that user is not engaging with the HMI.

For another example, the context module 502 can determine the travel context 202 based on the vehicle heading 204. Continuing with the example, the user of the first device 102 can represent the driver of the vehicle. The context module 502 can determine the vehicle heading 204 based on the location unit 420 of FIG. 4. If the vehicle heading 204 represents the vehicle is heading in a reversing direction, the context module 502 can determine the travel context 202 to represent that the vehicle is backing up and not moving forward.

For a different example, the context module 502 can determine the travel context 202 based on the traveling speed 206. The context module 502 can determine the traveling speed 206 based on the change in the current location 208 of FIG. 2 within a specified instance of the time period 210 of FIG. 2. The map information can indicate the speed limit 238 of FIG. 2 of the road type 212 of FIG. 2 within the geographic area 214 of FIG. 2. For further example, the map information can include the traffic information 216 of FIG. 2 within the geographic area 214.

Based on comparing the traveling speed 206 to the speed limit 238, the context module 502 can determine whether the traveling speed 206 is meeting, exceeding, or below the speed limit 238. For another example, the traffic information 216 can include the traveling speed 206 of the traffic flow on the road type 212, the geographic area 214, or a combination thereof. Based on comparing the traveling speed 206 of the vehicle with the first device 102 to the traveling speed 206 of the traffic flow along with the speed limit 238 for the road type 212, the context module 502 can determine whether the user is stuck in traffic jam or not.

For further example, the context module 502 can determine the travel context 202 based on the time period 210. More specifically as an example, the time period 210 can include the time of day, week, month, year, season, or a combination thereof. For example, the current location 208 can indicate that the user is in a northern hemisphere. The time period 210 can represent October. The context module 502 can determine the travel context 202 to represent fall season.

For another example, the context module 502 can determine the travel context 202 based on the vehicle status 332. For a specific example, the context module 502 can determine the vehicle status 332 based on the vehicle functionality 330 of FIG. 3 operated. For example, the vehicle functionality 330 can include the vehicle transmission including transmission gear. The current location 208 can indicate that the user is in the geographic area 214 representing a mountainous region. The vehicle functionality 330 can represent that the transmission gear is in low gear such as gear 1 or 2. The context module 502 can determine the vehicle status 332 to be in low gear to generate torque for more power for the vehicle. Based on the current location 208, the vehicle status 332, or a combination thereof, the context module 502 can determine the travel context 202 representing that the user is traveling uphill within the mountainous region.

For further example, the vehicle status 332 can include the diagnostics result 334 of FIG. 3 from the on-board diagnostics. For a specific example, the diagnostics result 334 can include that the fuel level of the vehicle, the tire pressure of the vehicle, or a combination thereof. The diagnostics result 334 can include a low fuel level when the fuel level is below the fuel threshold. Based on vehicle status 332 of low fuel level, the context module 502 can determine the travel context 202 of the user requiring to refuel the vehicle.

For further example, the vehicle functionality 330 can include operating the windshield wiper. The vehicle status 332 can include the activating the vehicle functionality 330 of using the windshield wiper. Based on the usage of the windshield wiper, the context module 502 can determine the travel context 202 of user using the windshield wiper during operation of the vehicle.

For a different example, the context module 502 can determine the travel context 202 based on the inside context 218 of FIG. 2, the outside context 220 of FIG. 2, or a combination thereof. The inside context 218 can include the number of passengers within the vehicle. The context module 502 can determine the inside context 218 representing the number of passengers based on the capturing device 314 of FIG. 3 representing the seat sensor. The capturing device 314 can be installed on each seat of the vehicle. Based on the number of the capturing device 314 detecting the object weight meeting or exceeding the weight threshold, the context module 502 can determine that the inside context 218 of how many passengers are inside of the vehicle. As a result, the context module 502 can determine the travel context 202 of whether the vehicle is traveling with more than one passenger or not.

For a different example, the outside context 220 can represent the weather condition surrounding the vehicle with the first device 102. Once instance of the capturing device 314 can represent a thermometer. Another instance of the capturing device 314 can represent a digital camera. The context module 502 can utilize the image recognition technology to determine the object outside of the vehicle. The thermometer can determine the temperature of the outside context 220. Based on determining the temperature to be subzero degree and determining the object to represent snow, the context module 502 can determine that outside context 220 to represent snow surrounding the vehicle. For further example, the context module 502 can determine the travel context 202 that the user is traveling in the snow condition based on the outside context 220.

For another example, the context module 502 can determine the travel context 202 based on the noise level 232 of FIG. 2 meeting or exceeding the noise threshold 244 of FIG. 2. For a specific example, if the noise level 232 meets or exceeds the noise threshold 244, the context module 502 can determine the travel context 202 to be noisy. For further example, if the noise level 232 is below the noise threshold 244, the context module 502 can determine the travel context 202 to represent an ideal environment to deliver the presentation content 304 of FIG. 3 representing the audio content 308 of FIG. 3.

The context module 502 can determine the travel context 202 based on each factor discussed above independently or in various combinations of the each factor discussed above dynamically and in real time. The context module 502 can transmit the travel context 202 to a permission module 504.

The navigation system 100 can include the permission module 504, which can be coupled to the context module 502. The permission module 504 determines the presentation permission 326 of FIG. 3. For example, the permission module 504 can determine the presentation permission 326 based on the travel context 202 to actuate the presentation interface 302 to present the presentation content 304.

The permission module 504 can determine the presentation permission 326 in a number of ways. For example, the permission module 504 can determine the presentation permission 326 based on the travel context 202 as discussed above. For example, the travel context 202 can indicate that the user action 316 is contacting the presentation interface 302. More specifically as an example, the travel context 202 can indicate that the user action 316 is to access the application 310 presented on the HMI. The permission module 504 can determine the presentation permission 326 of presenting the application 310 instead of the presentation content 304.

For further example, the travel context 202 can represent the inactivity time 322 of the HMI meeting or exceeding the time threshold 242. Based on the inactivity time 322, the permission module 504 can determine the presentation permission 326 of presenting the presentation content 304 instead of the application 310 on the HMI. More specifically as an example, presenting the application 310 can represent a default on the HMI. After the user action 316 represented interacting with the application 310 and the inactivity time 322 meets or exceeds the time threshold 242, the permission module 504 can determine the presentation permission 326 of "yes" to present the presentation content 304. The presentation content 304 can include the background advertisement.

For further example, the permission module 504 can determine the presentation permission 326 to update the presentation content 304 based on the presentation time 324 of FIG. 3 meeting or exceeding the time threshold 242. More specifically as an example, if the presentation content 304 has been presented for the presentation time 324 that meets or exceeds the time threshold 242, the permission module 504 can determine the presentation permission 326 of "yes" to update the presentation content 304.

For a different example, the permission module 504 can determine the presentation permission 326 based on the vehicle heading 204. If the vehicle heading 204 is other than the reverse direction, the permission module 504 can determine the presentation permission 326 of "yes" to present the presentation content 304. In contrast, if the vehicle heading 204 is in the reverse direction, the permission module 504 can determine the presentation permission 326 of "no" to present the presentation content 304. More specifically as an example, the HMI can display the video from the capturing device 314 representing a rear-view camera. Once the vehicle heading 204 changes to other than the reverse direction, the permission module 504 can determine the presentation permission 326 of "yes" to present the presentation content 304.

For further example, the permission module 504 can determine the presentation permission 326 based on the vehicle functionality 330. Continuing with the example above, the vehicle functionality 330 can represent the transmission of the vehicle. If the transmission is in reverse gear, the permission module 504 can determine the presentation permission 326 of "no" to present the presentation content 304.

For another example, the permission module 504 can determine the presentation permission 326 based on the traveling speed 206 meeting or exceeding the speed limit 238. More specifically as an example, the permission module 504 can determine the presentation permission 326 of updating the presentation content 304 if the traveling speed 206 is below the speed limit 238. If the traveling speed 206 meets or exceeds the speed limit 238, the permission module 504 can determine the presentation permission 326 of "no" to update the presentation content 304.

For further example, the permission module 504 can determine the presentation permission 326 based on the road type 212 of where the user is traveling. More specifically as an example, if the road type 212 is freeway or highway, the permission module 504 can determine the presentation permission 326 of "no" to present the presentation content 304 to the user. In contrast, if the road type 212 is neighborhood road or arterial road, the permission module 504 can determine the presentation permission 326 to represent "yes" to present the presentation content 304.

For further example, the permission module 504 can override the presentation permission 326 for traveling on specific instance of the road type 212. For example, the road type 212 currently traveled can represent the highway. If the traffic information 216 represents a traffic jam or the traveling speed 206 is below the speed limit 238, the permission module 504 can determine the presentation permission 326 of "yes" to present the presentation content 304 even if the user is traveling on the highway.

For a different example, the permission module 504 can determine the presentation permission 326 to update the presentation content 304 based on the traveling speed 206 of zero. More specifically as an example, if the current location 208 indicates that the user has stopped due to traffic controller including a stop sign or red light traffic signal, the permission module 504 can determine the presentation permission 326 of "yes" to update the presentation content 304.

For further example, the permission module 504 can determine the presentation permission 326 based on the vehicle status 332. More specifically as an example, the vehicle status 332 can represent parked. Since the vehicle is stationary, the permission module 504 can determine the presentation permission 326 of "yes" to present to presentation content 304. For further example, the vehicle status 332 can include the diagnostics result 334 representing a low fuel level. The permission module 504 can determine the presentation permission 326 of "yes" to present the presentation content 304 for the category of interest 222 of FIG. 2 of refueling station based on the low fuel level.

For another example, the permission module 504 can determine the presentation permission 326 based on the inside context 218 of the vehicle. The inside context 218 can represent no passenger in the vehicle. The permission module 504 can determine the presentation permission 326 of "no" to present the presentation content 304. In contrast, the inside context 218 can represent that the vehicle can include at least the driver. Based on the inside context 218, the permission module 504 can determine the presentation permission 326 of "yes" to present the presentation content 304.

For a different example, the permission module 504 can determine the presentation permission 326 based on the outside context 220, the time period 210, or a combination thereof. The time period 210 can represent 6 pm or after work. The outside context 220 can represent that sun had set. The permission module 504 can determine the presentation permission 326 of "yes" to present the presentation content 304 representing the category of interest 222 for restaurant and bar for happy hour specials.

For another example, the permission module 504 can determine the presentation permission 326 based on the noise level 232 meeting or exceeding the noise threshold 244. More specifically as an example, the permission module 504 can determine the presentation permission 326 of "no" if the noise level 232 meets or exceeds the noise threshold 244 as the travel context 202 can be too noisy to present the presentation content 304. In contrast, if the noise level 232 is below the noise threshold 244, the permission module 504 can determine the presentation permission 326 of "yes" to present the presentation content 304 as the travel context 202 can be suitable to present the presentation content 304.

For a different example, the permission module 504 can determine the presentation permission 326 based on the travel context 202 including the start location 224 of FIG. 2, the waypoint 226 of FIG. 2, the target location 228 of FIG. 2, or a combination thereof. More specifically as an example, the permission module 504 can compare the travel distance 230 of FIG. 2 to the distance threshold 240 of FIG. 2. For a specific example, if the travel distance 230 between the current location 208 and the start location 224 after departure meets or exceeds the distance threshold 240, the permission module 504 can determine the presentation permission 326 of "yes" to present the presentation content 304. For further example, if the travel distance 230 between the current location 208 and the waypoint 226 or the target location 228 is below the distance threshold 240, the permission module 504 can determine the presentation permission 326 of "no" to present the presentation content 304.

For another example, the permission module 504 can determine the presentation permission 326 based on the user profile 234 of FIG. 2, the passenger profile 236 of FIG. 2, or a combination thereof. More specifically as an example, the user profile 234, the passenger profile 236, or a combination thereof can indicate the presentation permission 326 for each factor of the travel context 202 as discussed above. Even if permission module 504 can determine the presentation permission 326 as "yes," if the user profile 234, the passenger profile 236, or a combination thereof indicates "no" for the specific factor of the travel context 202, the permission module 504 can determine the presentation permission 326 as "no". The opposite is true when even though the permission module 504 determined the presentation permission 326 as "no," if the user profile 234, the passenger profile 236, or a combination thereof, indicates "yes," the permission module 504 can determine the presentation permission 326 as "no."

The permission module 504 can determine the presentation permission 326 based on each factor discussed above independently or in various combinations of the each factor discussed above. Furthermore, the permission module 504 can determine the presentation permission 326 that is different between each factor or in various combinations considered. The permission module 504 can transmit the presentation permission 326 to a location module 506.

The navigation system 100 can include the location module 506, which can be coupled to the permission module 504. The location module 506 determines the presentation location 328 of FIG. 3. For example, the location module 506 can determine the presentation location 328 based on the presentation permission 326, the travel context 202, or a combination thereof to actuate the presentation interface 302 for presenting the presentation content 304.

The location module 506 can determine the presentation location 328 in a number of ways. For example, the vehicle can include multiple instances of the presentation interface 302 including the dashboard, the head unit, the center console, or a combination thereof. For further example, the vehicle can include other instances of the presentation interface 302 representing the windshield, the passenger window, the ceiling, the interior wall, or a combination thereof of the vehicle.

The location module 506 can determine the presentation location 328 based on the travel context 202, the presentation permission 326, or a combination thereof. The travel context 202 can indicate that the user action 316 is contacting the presentation interface 302 representing the head unit. The presentation permission 326 can represent "no" while the user is interacting with the application 310 of the HMI. The location module 506 can determine the presentation location 328 to include the presentation interface 302 other than the head unit. For example, the location module 506 can determine the presentation location 328 to include the presentation interface 302 representing the dashboard, the windshield, or a combination thereof.

For a different example, the location module 506 can determine the presentation location 328 based on the inactivity time 322 meeting or exceeding the time threshold 242. More specifically as an example, the comparison between the inactivity time 322 and the time threshold 242 can be made for each instance of the presentation interface 302. The presentation permission 326 can represent "yes" if the inactivity time 322 meets or exceeds the time threshold 242. The location module 506 can determine the presentation location 328 as the presentation interface 302 with the inactivity time 322 meeting or exceeding the time threshold 242. More specifically as an example, the location module 506 can determine the presentation interface 302 as the presentation location 328 where the presentation content 304 can be presented.

It has been discovered that the navigation system 100 determining the presentation location 328 based on the inactivity meeting or exceeding the time threshold 242 improves the performance of the navigation system 100. By excluding the presentation interface 302 with the presentation permission of "no" due to the inactivity time 322 below the time threshold 242, the navigation system 100 can focus on resource allocation to actuate the presentation interface 302 with the presentation permission 326 of "yes" for presenting the presentation content 304. As a result, the navigation system 100 can optimize the processes to deliver the presentation content 304 to the presentation location 328 most suited for the travel context 202.

For another example, the location module 506 can determine the presentation location 328 based on the presentation time 324 meeting or exceeding the time threshold 242. More specifically as an example, the comparison between the presentation time 324 and the time threshold 242 can be made for each instance of the presentation interface 302. The presentation permission 326 can represent "yes" if the presentation time 324 meets or exceeds the time threshold 242. The location module 506 can determine the presentation location 328 as the presentation interface 302 with the presentation time 324 meeting or exceeding the time threshold 242. More specifically as an example, the location module 506 can determine the presentation interface 302 as the presentation location 328 where the presentation content 304 can be updated for presentation.

For a different example, the location module 506 can determine the presentation location 328 based on the vehicle heading 204. Continuing with the example above, when the vehicle heading 204 is in reverse, the location module 506 can determine the presentation location 328 excluding each instance of the presentation interface 302 in front of the user. For example, each instance of the presentation interface 302 in front of the user can include the windshield, the dashboard, the head unit, or a combination thereof. Instead, the location module 506 can determine the presentation location 328 to include the back window, the side window of the rear passenger seat, or a combination thereof. For further example, if the vehicle heading 204 is heading in a direction other than the reverse direction, the location module 506 can determine the presentation location 328 to include the windshield, the dashboard, the head unit, the front passenger side window, the rear passenger side window, or a combination thereof.

For another example, the location module 506 can determine the presentation location 328 based on the traveling speed 206 meeting or exceeding the speed limit 238. More specifically as an example, if the traveling speed 206 meets or exceeds the speed limit 238, the location module 506 can determine the presentation location 328 as the dashboard, the windshield, or a combination thereof instead of the head unit to allow the user to focus on the driving of the vehicle moving forward. In contrast, if the traveling speed 206 is below the speed limit 238, the location module 506 can determine the presentation location 328 other than the dashboard, the windshield, or a combination thereof to present the presentation content 304.

It has been discovered that the navigation system 100 determining the presentation location 328 based on the traveling speed 206 meeting or exceeding the speed limit 238 improves the performance of the navigation system 100. By excluding the presentation interface 302 with the presentation permission of "no" due to the traveling speed 206 meeting or exceeding the speed limit 238, the navigation system 100 can focus on resource allocation to actuate the presentation interface 302 with the presentation permission 326 of "yes" for presenting the presentation content 304. As a result, the navigation system 100 can optimize the processes to deliver the presentation content 304 to the presentation location 328 most suited for the travel context 202.

For a different example, the location module 506 can determine the presentation location 328 based on the time period 210. More specifically as an example, the location module 506 can determine or update the presentation location 328 based on the time period 210. For a specific example, if the time period 210 represents a morning time, the location module 506 can determine the presentation location 328 to represent the head unit. In contrast, if the time period 210 represents an evening time, the location module 506 can determine the presentation location 328 to represent the dashboard. Depending on the time period 210, the location module 506 can determine the presentation location 328 that is different to select the presentation location 328 most suitable for the time period 210. The location module 506 can update the presentation location 328 according to the time period to present the presentation content 304 at different instances of the presentation interface 302.

For another example, the location module 506 can determine the presentation location 328 based on the vehicle functionality 330. More specifically as an example, the vehicle functionality 330 can represent the windshield wiper being activated. The location module 506 can determine the presentation location 328 based on the windshield wiper being used by excluding the windshield as the presentation location 328. Moreover, the location module 506 can determine the presentation location 328 to represent other instances of the presentation interface 302.

For a different example, the location module 506 can determine the presentation location 328 based on the user profile 234, the passenger profile 236, or a combination thereof. The capturing device 314 representing a digital camera can capture a digital image of the driver, the passenger, or a combination thereof in the vehicle. The location module 506 can match the captured digital image of the driver to the user profile 234, the passenger to the passenger profile 236, or a combination thereof based on the image recognition technology to identify the user, the passenger, or a combination thereof.

For example, the user profile 234 can indicate which instance of the presentation interface 302 the driver prefers to present the presentation content 304. Similarly, the passenger profile 236 can indicate which instance of the presentation interface 302 the passenger prefers to present the presentation content 304. Based on the user profile 234, the passenger profile 236, or a combination thereof the location module 506 can determine the presentation location 328 to present the presentation content 304 most suited for the driver, the passenger, or a combination thereof.

For further example, the location module 506 can determine the combination of multiple instances of the presentation location 328 based on the user profile 234, the passenger profile 236, or a combination thereof. More specifically as an example, if the user profile 234 and the passenger profile 236 share the same preference for the specific instance of the presentation interface 302 to present the presentation content 304, the location module 506 can determine the presentation location 328 to represent the presentation interface 302 preferred by the driver and the passenger.

It has been discovered that the navigation system 100 determining the presentation location 328 based on the user profile 234, the passenger profile 236, or a combination thereof improves the performance of the navigation system 100. By selecting which instance of the presentation interface 302 to actuate based on the user profile 234, the passenger profile 236, or a combination thereof, the navigation system 100 can focus on resource allocation to actuate the presentation interface 302 relevant to the user profile 234, the passenger profile 236, or a combination thereof for presenting the presentation content 304. As a result, the navigation system 100 can optimize the processes to deliver the presentation content 304 to the presentation location 328 most suited for the travel context 202.

The location module 506 can determine the presentation location 328 based on each factor discussed above independently or in various combinations of the each factor discussed above. Furthermore, the location module 506 can determine the presentation location 328 that is different between each factor or in various combinations considered. The location module 506 can transmit the presentation location 328 to a type module 508.

The navigation system 100 can include the type module 508, which can be coupled to the location module 506. The type module 508 determines the presentation type 312 of FIG. 3. For example, the type module 508 can determine the presentation type 312 based on the travel context 202, the presentation permission 326, the presentation location 328, or a combination thereof.

The type module 508 can determine the presentation type 312 in a number of ways. For example, the type module 508 can determine the presentation type 312 of the presentation content 304 representing the display content 306 of FIG. 3. More specifically as an example, if the presentation permission 326 is "yes" for the presentation location 328, the type module 508 can determine the presentation type 312 as the display content 306 to display on the presentation interface 302. In contrast, if the presentation permission 326 is "no" for the presentation location 328, the type module 508 can determine the presentation type 312 as the audio content 308. For further example, if the presentation permission 326 is "no" for the presentation location 328, the type module 508 can determine the presentation type 312 as the application 310 for the HMI.

For another example, the type module 508 can determine the presentation type 312 based on the traveling speed 206 meeting or exceeding the speed limit 238. More specifically as an example, if the traveling speed 206 meets or exceeds the speed limit 238, the type module 508 can determine the presentation type 312 as the audio content 308 instead of the display content 306. In contrast, if the traveling speed 206 is below the speed limit 238, the type module 508 can determine the presentation type 312 as the display content 306.

For a different example, the type module 508 can determine the presentation type 312 based on the noise level 232 meeting or exceeding the noise threshold 244. More specifically as an example, if the noise level 232 meets or exceeds the noise threshold 244, the type module 508 can determine the presentation type 312 as the display content 306 instead of the display content 306. In contrast, if the noise level 232 is below the noise threshold 244, the type module 508 can determine the presentation type 312 as the audio content 308.

For another example, the type module 508 can determine the presentation type 312 based on the user action 316. As discussed above, while the user action 316 indicates the user action 316 represents the user interacting with the application 310 presented on the HMI. Based on the user action 316, the type module 508 can determine the presentation type 312 as the audio content 308 instead of the display content 306 while the user is interacting with the application 310.

The type module 508 can determine the presentation type 312 based on each factor discussed above independently or in various combinations of the each factor discussed above. Furthermore, the type module 508 can determine the presentation type 312 that is different between each factor or in various combinations considered. The type module 508 can transmit the presentation type 312 to a presentation module 510.

The navigation system 100 can include the presentation module 510, which can be coupled to the type module 508. The presentation module 510 presents the presentation content 304. For example, the presentation module 510 can present the presentation content 304 based on the presentation type 312, the travel context 202, the presentation permission 326, the presentation location 328, or a combination thereof.

More specifically as an example, the presentation module 510 can display the presentation type 312 of the display content 306 on the presentation interface 302 representing the hardware display, the video screen, or a combination thereof. For another example, the presentation module 510 can play the presentation type 312 of the display content 306 representing the video stream, the audio content 308, or a combination thereof by the presentation interface 302 including the video screen, the speaker, the headset, or a combination thereof.

For further example, the presentation module 510 can update the presentation content 304 based on the user action 316. The display content 306 representing an image can be displayed on the first presentation interface 302. The user action 316 can represent contacting the presentation interface 302 to engage with the GUI for the display content 306. For a different example, the user action 316 can include clicking or tapping the vehicle functionality 330 representing a button on the steering wheel to engage with the display content 306. For another example, the user action 316 can include giving a voice command which the first user interface 418 of FIG. 4 along with the presentation interface 302 can capture the voice command. Based on the user action 316, the presentation module 510 can update the presentation content 304 by presenting the display content 306 representing the video stream, the audio content 308, or a combination thereof.

For additional example, the presentation module 510 can present the presentation content 304 based on the user action 316, the category of interest 222, or a combination thereof according to the user profile 234, the passenger profile 236, or a combination thereof. More specifically as an example, the user action 316 can represent selecting the display content 306 for the category of interest 222 for ice cream. The passenger profile 236 can include a daughter sitting in the backseat of the vehicle. Based on the user action 316, the presentation module 510 can present the display content 306 for the ice cream to the side window closest to where the daughter is sitting.

For another example, the user profile 234 can indicate where the presentation content 304 should be displayed based on the action type 318 of FIG. 3 of the user action 316. More specifically as an example, if the action type 318 represents a tap on the steering wheel, the presentation module 510 can present the audio content 308. For a different example, if the action type 318 represents a selecting the GUI on the presentation interface 302, the presentation module 510 can display the display content 306.

The presentation module 510 can present the presentation content 304 according to the presentation permission 326, the presentation location 328, the travel context 202, the presentation type 312, or a combination thereof as permitted and discussed above. The presentation module 510 can transmit the presentation content 304 presented to a track module 512.

The navigation system 100 can include the track module 512, which can be coupled to the presentation module 510. The track module 512 tracks the user engagement 320 of FIG. 3. For example, the track module 512 can track the user engagement 320 based on the presentation content 304.

The track module 512 can track the user engagement 320 in a number of ways. For example, the track module 512 can track the user engagement 320 based on the user action 316. More specifically as an example, the track module 512 can track the user engagement 320 according to the action type 318, the presentation content 304, or a combination thereof. For further example, the track module 512 can track the user engagement 320 for each instance of the presentation content 304 presented and the corresponding instance of the action type 318 performed by the user, the passenger, or a combination thereof.

For another example, the track module 512 can track the user engagement 320 based on the travel context 202, the action type 318, the presentation content 304, or a combination thereof. More specifically as an example, depending on the travel context 202, the track module 512 can track how responsive was the user to the presentation content 304 under the travel context 202. For further example, the track module 512 can track the action type 318 taken when the presentation content 304 was presented to the user under the travel context 202.

The physical transformation from presenting the presentation content 304 results in the movement in the physical world, such as people using the first device 102, the vehicle, or a combination thereof, based on the operation of the navigation system 100. As the movement in the physical world occurs, the movement itself creates additional information that is transformed from physical aspect to digital data for further determination of the travel context 202, the presentation permission 326, the presentation location 328, or a combination thereof for the continued operation of the navigation system 100 and to continue the movement in the physical world.

The first software 426 of FIG. 4 of the first device 102 of FIG. 4 can include the modules for the navigation system 100. For example, the first software 426 can include the context module 502, the permission module 504, the location module 506, the type module 508, the presentation module 510, the track module 512, or a combination thereof. The first control unit 412 of FIG. 4 can execute the modules to perform the functions dynamically and in real time.

The first control unit 412 can execute the first software 426 for the context module 502 to determine the travel context 202. The first control unit 412 can execute the first software 426 for the permission module 504 to determine the presentation permission 326. The first control unit 412 can execute the first software 426 for the location module 506 to determine the presentation location 328. The first control unit 412 can execute the first software 426 for the type module 508 to determine the presentation type 312. The first control unit 412 can execute the first software 426 for the presentation module 510 to present the presentation content 304. The first control unit 412 can execute the first software 426 for the track module 512 to track the user engagement 320.

The second software 442 of FIG. 4 of the first device 102 of FIG. 4 can include the modules for the navigation system 100. For example, the second software 442 can include the context module 502, the permission module 504, the location module 506, the type module 508, the presentation module 510, the track module 512, or a combination thereof. The first control unit 412 of FIG. 4 can execute the modules to perform the functions dynamically and in real time. The second control unit 434 of FIG. 4 can execute the modules to perform the functions dynamically and in real time.

The second control unit 434 can execute the second software 442 for the context module 502 to determine the travel context 202. The second control unit 434 can execute the second software 442 for the permission module 504 to determine the presentation permission 326. The second control unit 434 can execute the second software 442 for the location module 506 to determine the presentation location 328. The second control unit 434 can execute the second software 442 for the type module 508 to determine the presentation type 312. The second control unit 434 can execute the second software 442 for the presentation module 510 to present the presentation content 304. The second control unit 434 can execute the second software 442 for the track module 512 to track the user engagement 320.

The modules of the navigation system 100 can be partitioned between the first software 426 and the second software 442. The second software 442 can include the context module 502, the permission module 504, the location module 506, the type module 508, and the track module 512. The second control unit 434 can execute modules partitioned on the second software 442 as previously described.

The first software 426 can include the presentation module 510. Based on the size of the first storage unit 414, the first software 426 can include additional modules of the navigation system 100. The first control unit 412 can execute the modules partitioned on the first software 426 as previously described.

It has been discovered that the navigation system 100 having different configuration of a distributed architecture to actuate each module on the first device 102 or the second device 106 enhances the capability to determine the travel context 202, the presentation permission 326, the presentation location 328, or a combination thereof. By having the distributed architecture, the navigation system 100 can enable load distribution to receive the information related to the content attribute 210 to reduce congestion in bottleneck in the communication path 104 of FIG. 1 and enhance the capability of the navigation system 100. As a result, the navigation system 100 can improve the performance to control the traffic flow for presenting the presentation content 304 for safer operation of the first device 102, the vehicle, or a combination thereof.

The first control unit 412 can operate the first communication unit 416 of FIG. 4 to transmit the travel context 202, the presentation permission 326, the presentation location 328, the presentation type 312, the presentation content 304, the user engagement 320, or a combination thereof to or from the second device 106 through the communication path 104 of FIG. 4. The first control unit 412 can operate the first software 426 to operate the location unit 420 of FIG. 4. The second control unit 434 can operate the second communication unit 436 of FIG. 4 to transmit the travel context 202, the presentation permission 326, the presentation location 328, the presentation type 312, the presentation content 304, the user engagement 320, or a combination thereof to or from the first device 102 through the communication path 104.

The navigation system 100 describes the module functions or order as an example. The modules can be partitioned differently. For example, the presentation module 510 and the track module 512 can be combined. Each of the modules can operate individually and independently of the other modules. Furthermore, data generated in one module can be used by another module without being directly coupled to each other. For example, the location module 506 can receive the travel context 202 from the context module 502. Further, one module transmitting to another module can represent one module communicating, sending, receiving, or a combination thereof the data generated to or from another module.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively as depicted in FIG. 4. However, it is understood that the first control unit 412, the second control unit 434, or a combination thereof can collectively refer to all hardware accelerators for the modules. Furthermore, the first control unit 412, the second control unit 434, or a combination thereof can be implemented as software, hardware, or a combination thereof.

The modules described in this application can be implemented as instructions stored on a non-transitory computer readable medium to be executed by the first control unit 412, the second control unit 434, or a combination thereof. The non-transitory computer medium can include the first storage unit 414, the second storage unit 446 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 6:
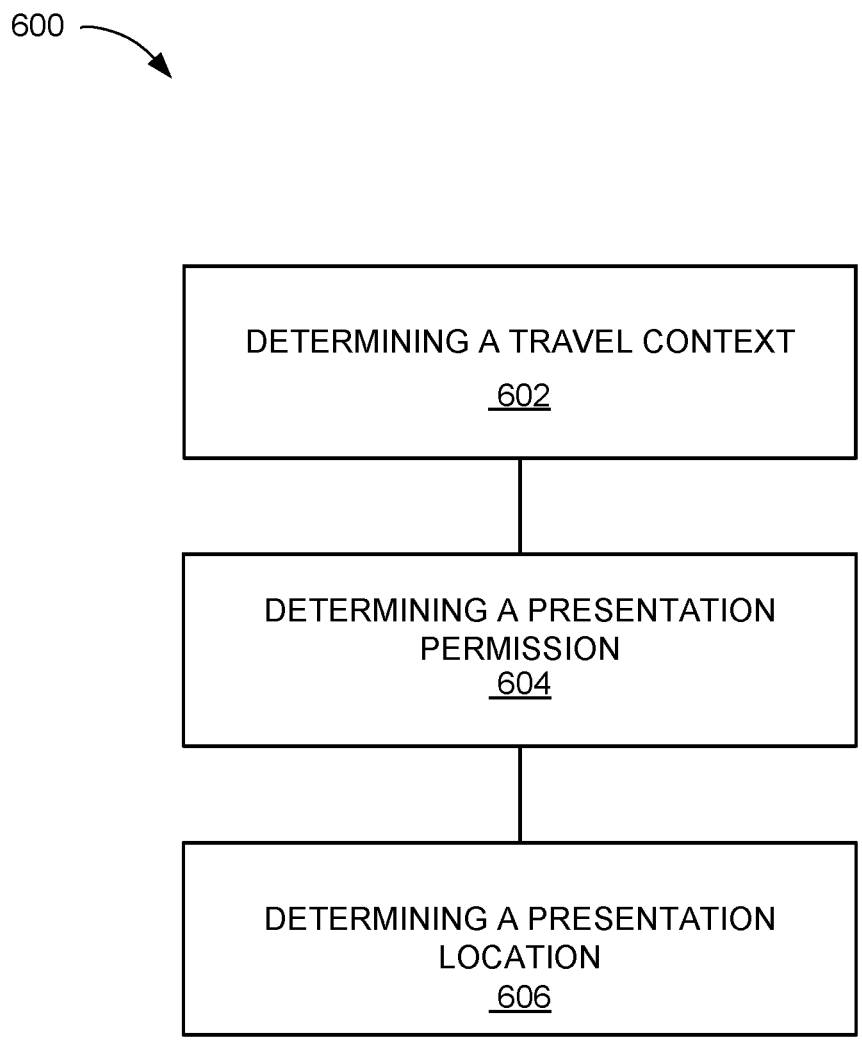
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: determining a travel context with a control unit based on a traveling speed in a block 602; determining a presentation permission based on the travel context for actuating a presentation interface in a block 604; and determining a presentation location based on the presentation permission for identifying the presentation interface to present a presentation content in a block 606.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    determining with a control unit a travel context based on a traveling speed;
    determining a presentation permission based on the travel context executing by control unit a function dynamically and in real time actuating a presentation interface out of presentation interfaces wherein each of the presentation interface represents a hardware device; and
    determining a presentation location, representing which one of the presentation interfaces to present a presentation content, based on the presentation permission identifying the presentation interface configured to present the presentation content.

2. The method as claimed in claim 1 wherein determining the presentation location includes determining the presentation location for selecting the presentation interface from multiple instances of the presentation location.

3. The method as claimed in claim 1 further comprising determining a presentation type based on a noise level meeting or exceeding a noise threshold.

4. The method as claimed in claim 1 wherein determining the presentation permission includes determining the presentation permission based on a user action for presenting the presentation content instead of an application.

5. The method as claimed in claim 1 wherein determining the presentation permission includes determining the presentation permission based on an inactivity time meeting or exceeding a time threshold.

6. The method as claimed in claim 1 wherein determining the presentation permission includes determining the presentation permission based on a vehicle heading for presenting the presentation content.

7. The method as claimed in claim 1 wherein determining the presentation permission includes determining the presentation permission based on a traveling speed (20) meeting or exceeding a speed limit.

8. The method as claimed in claim 1 wherein determining the presentation location includes determining the presentation location based on a vehicle heading for selecting the presentation interface.

9. The method as claimed in claim 1 wherein determining the presentation location includes determining the presentation location based on a traveling speed (20) meeting or exceeding a speed limit.

10. The method as claimed in claim 1 wherein determining the presentation location includes determining the presentation location based on an action type.

11. A navigation system comprising:
    a control unit configured to:
    determine a travel context based on a traveling speed;
    determine a presentation permission based on the travel context to execute a function dynamically and in real time actuating a presentation interface out of presentation interfaces wherein each of the presentation interface represents a hardware device;
    determine a presentation location, representing which one of the presentation interfaces to present a presentation content, based on the presentation permission identifying the presentation interface to present the presentation content; and
    a communication unit, coupled to the control unit, configured to transmit the presentation content displaying on a device.

12. The system as claimed in claim 11 wherein the control unit is configured to determine the presentation location for selecting the presentation interface from multiple instances of the presentation location.

13. The system as claimed in claim 11 wherein the control unit is configured to determine a presentation type based on a noise level meeting or exceeding a noise threshold.

14. The system as claimed in claim 11 wherein the control unit is configured to determine the presentation permission based on a user action for presenting the presentation content instead of an application.

15. The system as claimed in claim 11 wherein the control unit is configured to determine the presentation permission based on an inactivity time meeting or exceeding a time threshold.

16. A non-transitory computer readable medium including instructions for execution, the instructions comprising:
   determining a travel context with a control unit based on a traveling speed;
   determining a presentation permission based on the travel context to execute a function dynamically and in real time actuating a presentation interface out of presentation interfaces wherein each of the presentation interface represents a hardware device; and
   determining a presentation location, representing which one of the presentation interfaces to present a presentation content, based on the presentation permission identifying the presentation interface to present the presentation content.

17. The non-transitory computer readable medium as claimed in claim 16 wherein determining the presentation location includes determining the presentation location for selecting the presentation interface from multiple instances of the presentation location.

18. The non-transitory computer readable medium as claimed in claim 16 further comprising determining a presentation type based on a noise level meeting or exceeding a noise threshold.

19. The non-transitory computer readable medium as claimed in claim 16 wherein determining the presentation permission includes determining the presentation permission based on a user action for presenting the presentation content instead of an application.

20. The non-transitory computer readable medium as claimed in claim 16 wherein determining the presentation permission includes determining the presentation permission based on an inactivity time meeting or exceeding a time threshold.

* * * * *